United States Patent
McJones et al.

(10) Patent No.: US 6,250,689 B1
(45) Date of Patent: Jun. 26, 2001

(54) REINFORCED TUBE JOINT

(75) Inventors: Stephen F. McJones, San Pedro; Joseph U. Tleimat, Mission Viejo; J. William Jones, Fountain Valley, all of CA (US)

(73) Assignee: Atlantic Richfield Company, Chicago, IL (US)

( * ) Notice: Subject to any disclaimer, the term of this patent is extended or adjusted under 35 U.S.C. 154(b) by 0 days.

(21) Appl. No.: 09/110,785

(22) Filed: Jul. 6, 1998

(51) Int. Cl.[7] .................... F16L 13/04; F16L 5/02; B01J 8/06
(52) U.S. Cl. .............. 285/115; 285/288.1; 285/201; 285/136.1; 228/136; 228/173.4
(58) Field of Search ................. 285/115, 288.1, 285/136.1, 201; 228/136, 154, 173.2, 173.4

(56) References Cited

U.S. PATENT DOCUMENTS

| | | | |
|---|---|---|---|
| Re. 22,436 | * 2/1944 | Kerr | 285/288.1 |
| 2,137,097 | * 11/1938 | Sateren | 285/288.1 |
| 2,166,890 | * 7/1939 | Desmond | 285/288.1 |
| 2,539,057 | * 1/1951 | Brown | 285/115 |
| 2,878,040 | * 3/1959 | Hobbs | 285/288.1 |
| 2,917,822 | * 12/1959 | Boice | 285/115 |
| 3,404,906 | * 10/1968 | Hutton | 285/288.1 |
| 3,439,941 | * 4/1969 | Nicol | 285/288.1 |
| 4,175,779 | * 11/1979 | Apblett, Jr. | 285/115 |
| 4,526,137 | * 7/1985 | Garrison et al. | 122/476 |

* cited by examiner

Primary Examiner—Eric K. Nicholson
(74) Attorney, Agent, or Firm—Ekkehard Schoettle; F. Lindsay Scott

(57) ABSTRACT

A reinforced tube joint formed by a first tube having an end portion; a stress collar fitted, with an interference fit, about the first tube so that the end portion of the first tube extends beyond the stress collar; and a second tube having an end rigidly connected to both the stress collar and the end portion of the first tube.

14 Claims, 3 Drawing Sheets

REINFORCED TUBE JOINT

FIELD OF THE INVENTION

The invention relates generally to tube joints and, more particularly, to tube joints that are reinforced so that the joint and tubes joined thereto can withstand relatively high thermal stresses.

BACKGROUND OF THE INVENTION

Systems of pipes and tubes (hereinafter "tubes") are frequently utilized in oil and gas refineries and in chemical processing plants. In many applications, tubing is used not only as a conduit for transporting fluids to be processed, but also as an integral component of processing equipment. Additionally, such furnace tubes may also contain catalyst to cause a catalytic reaction to occur as the fluid flows therethrough. Such furnace tubes typically experience substantial thermal expansion, which may create bending stresses on the tubes and, particularly, at joints where the furnace tubes are connected to other tubes, such as "cross-over" tubes which may be used to carry heated fluid from the furnace tubes to headers. Because such cross-over tubes are not exposed to as much heat as the furnace tubes are exposed to, and because cross-over tubes must be somewhat flexible to accommodate the thermal expansion of the furnace tubes, cross-over tubes are typically provided with thinner walls than furnace tubes. As a result, cross-over tubes typically experience greater bending stress than furnace tubes. Consequently, the joint between cross-over tubes and furnace tubes is particularly susceptible to failure and typically is a weak point in the system of tubes. A failure can result in the leakage of heated hydrocarbons which can result in fires and explosions and, as a result, can be very dangerous and require an unplanned and costly shut down of the furnace and units associated with the furnace so that the failure may be repaired.

Typically, joints between furnace tubes and cross-over tubes are welded together. Furthermore, they are commonly reinforced by welding a fitting, such as a sockolet, onto the side of the furnace tube so that the cross-over tube may be fitted into a recess in the sockolet and welded thereto. When the cross-over tube is welded to the sockolet, however, heat from the weld operation creates residual stress in the portion of the tube proximate to the weld, reduces the allowable stress of that portion of the tube, and increases the stress concentration at that portion of the tube. To compensate for these consequences, a stress collar may be fitted about the cross-over tube to reinforce it. To enable the stress collar to readily fit over the cross-over tube, the stress collar is generally sized to provide a small gap of, for example, approximately 10–20 mills (i.e., 0.01–0.02 inches) between the inside diameter of the collar and the outside diameter of the cross-over tube. The purpose of the stress collar, however, is largely defeated because, as a result of the gap, when the header thermally expands and causes the cross-over tube to deflect, the deflection is not constrained by the stress collar and a bending moment and a resulting bending stress induced in the cross-over tube is not distributed and absorbed by the stress collar as intended. As a consequence, the reduction of the failure rate of cross-over tubes using stress collars is minimal at best and, often, the failure rate is actually increased, and the dangers and costs discussed above are increased.

In an alternative attempt to reduce joint stresses and failures, expansion joints may be used to join furnace tubes to cross-over tubes. Expansion joints, however, are very costly and, while they reduce the stresses that the cross-over tubes are exposed to, they are still susceptible to leakage and the resultant dangers and costs associated therewith as discussed above.

As a result of the potential danger and cost of joint failures, a continuing search has been directed to the development of tube joints that can withstand relatively high thermal stresses.

SUMMARY OF THE INVENTION

According to the present invention, it has been found that a tube joint which can withstand relatively high thermal bending stresses comprises a first tube having an end portion; a stress collar fitted, with an interference fit, about the first tube so that the end portion of the first tube extends beyond the stress collar; and a second tube having an end rigidly connected to both the stress collar and the end portion of the first tube.

The present invention also provides a method for fabricating a reinforced joint between an end portion of a first tube and an end of a second tube, by fitting, with an interference fit, a stress collar about the first tube so that the end portion of the first tube extends beyond the stress collar; and rigidly connecting the end of the second tube to both the stress collar and the end portion of the first tube.

DESCRIPTION OF THE PREFERRED EMBODIMENT

Figure 1:
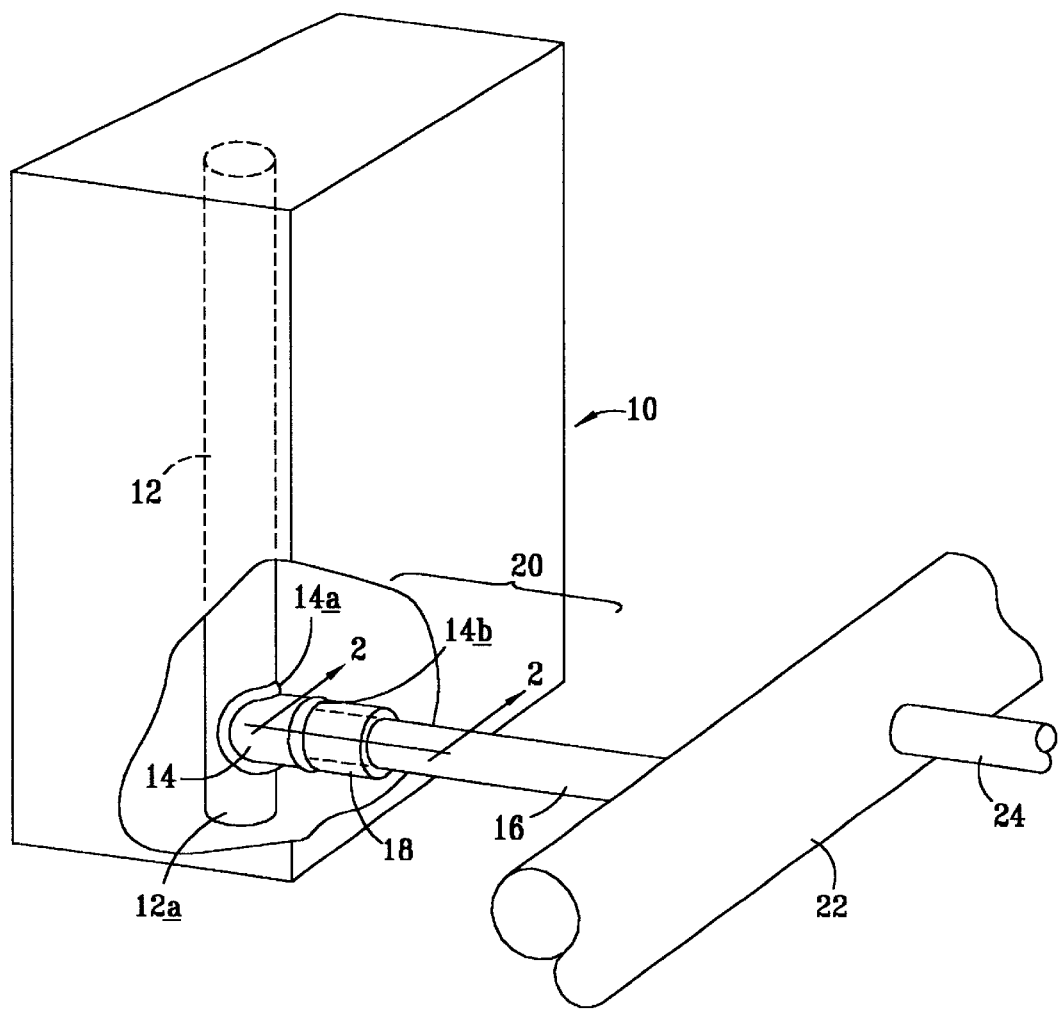
FIG. 1 is a perspective view of a furnace tube joined to a cross-over tube at a joint.

In FIG. 1, the reference numeral 10 generally designates a portion of furnace in which fluids, such as hydrocarbons, are heated as they flow through an array of furnace tubes positioned within the furnace 10, one of which tubes is representatively depicted as a furnace tube 12. The furnace tube 12 may contain catalyst to catalyze a reaction in the fluid as the fluid is heated and flows through the tube. A first end 14a of a sockolet 14 is welded or otherwise secured to a side wall of a lower end portion 12a of the furnace tube 12 in a manner well known in the art. A cross-over tube 16 and a stress collar 18 are welded to a second end 14b of the sockolet 14, as described below with respect to FIG. 2, to form a reinforced tube joint 20. The cross-over tube 16 is connected to an inlet (not shown) of a header 22. The header 22 is configured for collecting fluid from a plurality of furnace tubes, such as the furnace tube 12, via a plurality of cross-over tubes, such as the cross-over tube 16, and directing the collected fluid through an outlet 24 for further processing as is well known in the art.

Figure 2:
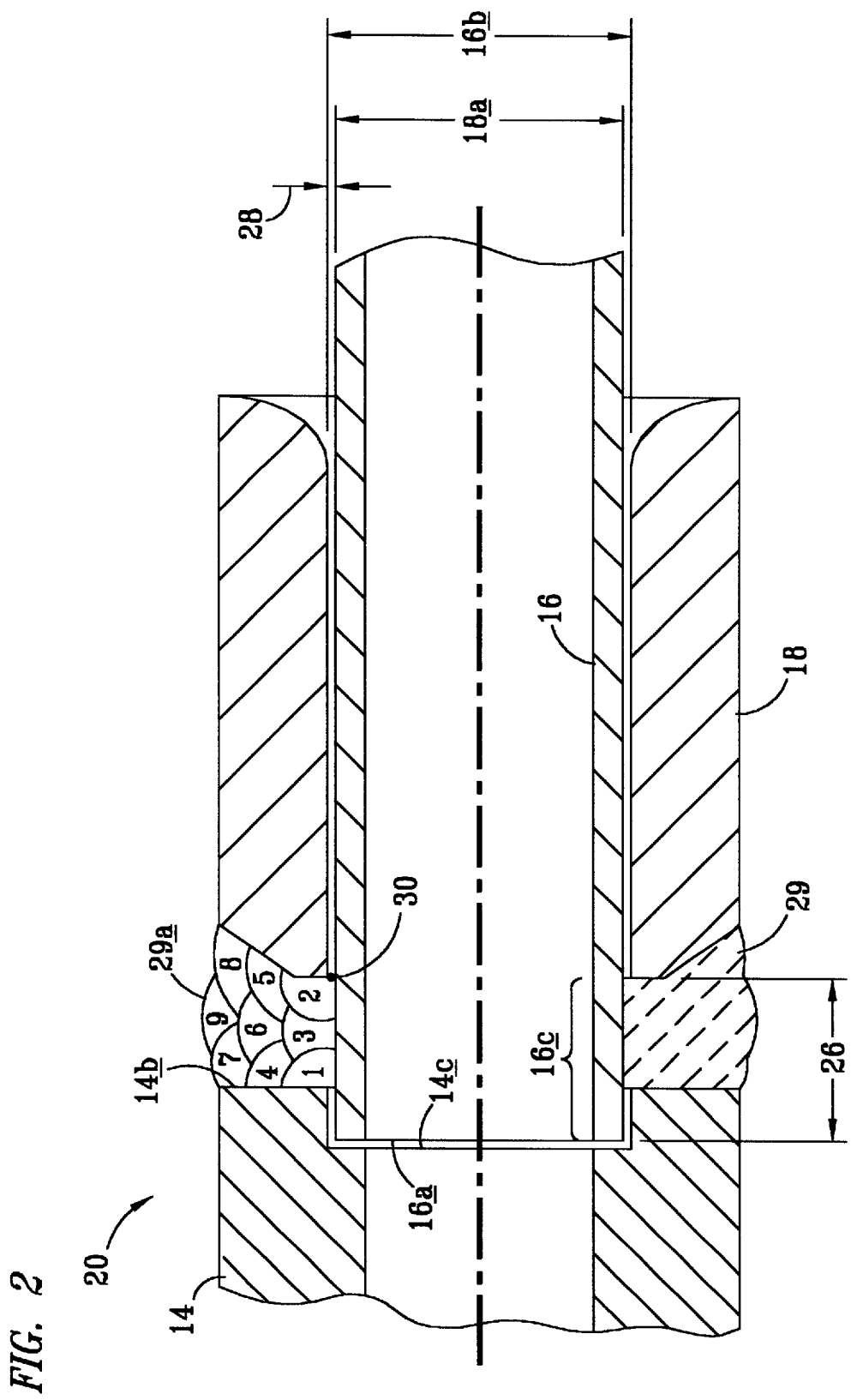
FIG. 2 is a cross-sectional view of the joint of FIG. 1, taken along the line 2—2 of FIG. 1, configured in accordance with the prior art.

FIG. 2 depicts the second end 14b of the sockolet 14 in greater detail as having a recess 14a formed therein as a socket for receiving an end 16a of the cross-over tube 16 in a conventional manner. It is understood that the sockolet 14 is used herein for the purpose of illustration, and that any one a number of different types of fittings, couplings, or integrally reinforced branch connections such as, for example, the sockolet 14, a weldolet, or the like, could be used.

Furthermore, in some instances, it may be preferable to not use any type of fitting welded, or otherwise secured, to the lower end 12a of the furnace tube 12.

The stress collar 18 has an inside diameter (ID) 18a of approximately 20 to 35 mils (where 1 mil=0.001 inches) greater than an outside diameter (OD) 16b of the tube 16 (when the cross-over tube 16 and the stress collar 18 are at substantially the same temperature). The stress collar 18 is positioned over the cross-over tube 16 in a manner well known in the art such that an end portion 16c of the tube 16 is defined having a length 26 which is suitably determined to provide for a welding space, described below, and is typically a multiple of the outside diameter 16b of the cross-over tube 16, the multiple being between about 0.1 to about 1.0, and typically between about 0.25 to about 0.75, and preferably about 0.5. As a consequence of the difference between the ID 18a and the OD 16b, a mean non-zero gap 28 of about 10 to 18 mils is formed between the tube 16 and the stress collar 18.

The joint 20 (FIG. 1) is fabricated in a manner well known in the art by positioning the end 16a (FIG. 2) of the cross-over tube 16, with the stress collar 18 fitted thereabout, into the recess 14c of the sockolet 14, and rigidly connecting the tube 16 thereto with a combination of conventional filet welds and bridge welds laid in the annular welding space 29 formed about the end portion 16c of the tube 16 between the end 14b of the sockolet 14 and the stress collar 18. A portion 29a of the annular space 29 depicts the numerical order in which the filet and bridge welds are preferably applied. Because such joints and the fabrication thereof are well known to those skilled in the art, they will not be discussed further.

In operation, the furnace 10 heats the furnace tube 12 to elevated temperatures which may exceed 1700° F., causing the furnace tube 12 to thermally expand. The heated gas or other fluid passed from the furnace tube 12 to the header 22 causes the header to expand longitudinally thereby causing the cross-over tube 16 connected thereto to bend and to deflect laterally within the stress collar 18. As a result of the gap 28 between the cross-over tube 16 and the stress collar 18, deflection of the tube 16 is not constrained by the stress collar 18 and a bending moment and bending stress created in the tube 16 are concentrated at the point 30. As noted above, the allowable stress of the cross-over tube 16 at the point 30 is reduced due to its inherent proximity to the area at which the aforementioned weld operation has been performed to rigidly connect the cross-over tube 16 to the sockolet 14. The increased concentration of stress at the point 30 together with the reduced allowable stress at the point 30 may result in failure of the joint 20 at that point, and leakage of hot fluids. As discussed above, such failures may result in fires and explosions and, consequently, may be very dangerous. The repair of such failures may require an unplanned and costly shut down of the furnace 10 and other units associated with the furnace.

Figure 3:
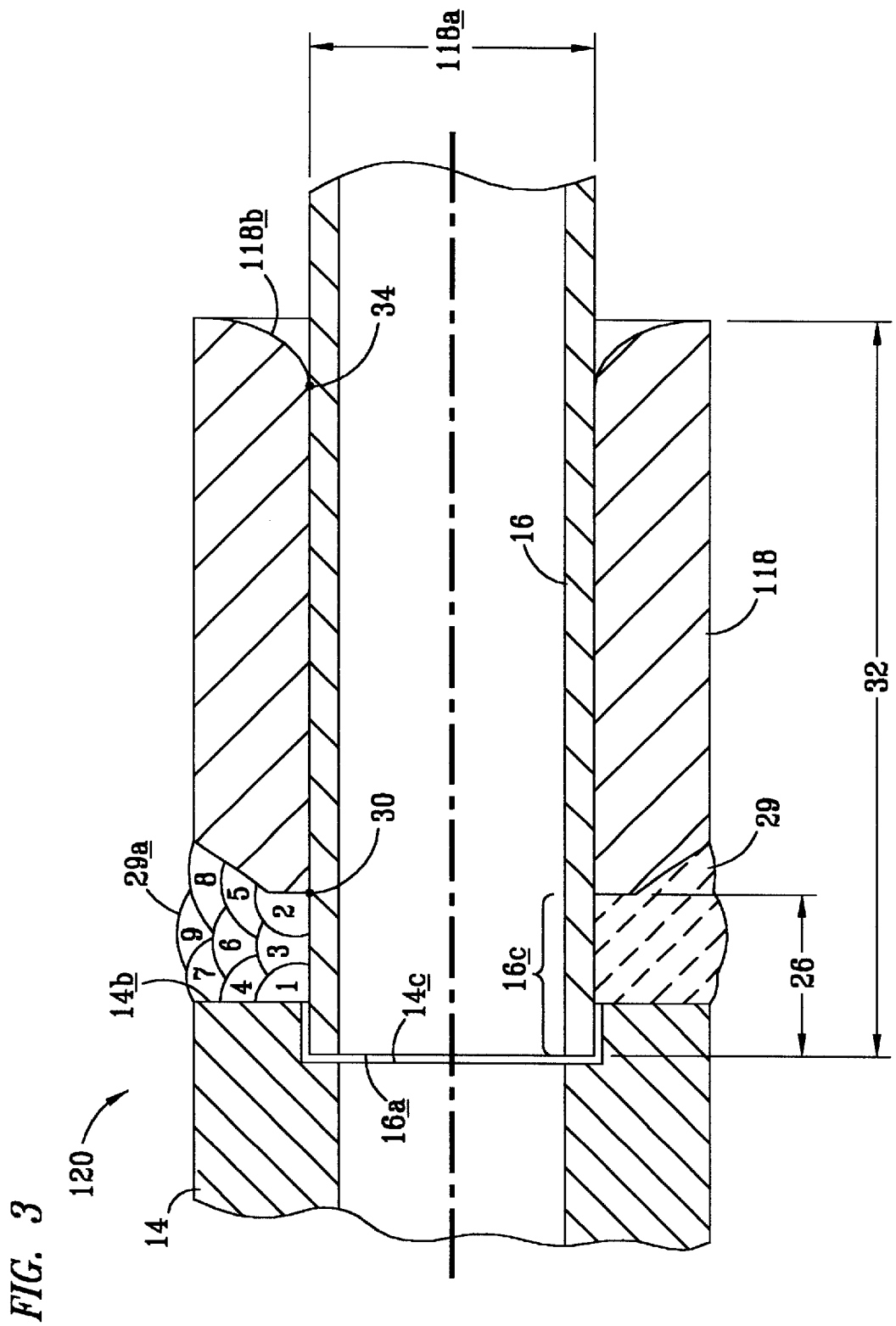
FIG. 3 is a cross-sectional view, taken along the line 2—2 of FIG. 1, in which the joint depicted therein has been modified in accordance with the present invention.

In FIG. 3, an embodiment of the present invention is shown which is similar to the previous embodiment, but which utilizes a reinforced tube joint 120 in lieu of the joint 20 to reduce the stress and failure rate of the joint. The embodiment of the joint 120 shown in FIG. 3 is similar to the foregoing embodiment of the joint 20 depicted in FIGS. 1 and 2, except that the joint 120 comprises a stress collar, designated in FIG. 3 by the reference numeral 118, sized to have an ID 118a which, when at substantially the same temperature as the cross-over tube 16, is less than the OD 16b (FIG. 2) of the cross-over tube 16 by an amount of about 1 to about 20 mils and, typically, about 1.5 to about 10 mils and, preferably, about 2 mil. It can thus be appreciated that, in contrast to the previous embodiment shown in FIG. 2, the fit of the stress collar 118 over the cross-over tube 16 forms a shrink, or interference, fit. Such an interference fit may be achieved using any of a number of techniques well known in the art, such as by heating the stress collar 118 until it thermally expands sufficiently to slide over the cross-over tube 16, and/or by press-fitting the stress collar 118 over the tube 16, or the like. Additionally, the stress collar 118 is configured with a minimum length 32 typically equal to at least the OD 16b and, preferably, at least twice the OD 16b, for dissipating a bending moment and bending stress generated between the cross-over tube 16 and an end 118b of the stress collar 118, such as at a point 34, before such bending moment and bending stress are transmitted to the cross-over tube 16 at the point 30.

After the stress collar 118 is shrink fitted about the cross-over tube 16, the remainder of the joint 120 is fabricated, as discussed above with respect to the joint 20, by positioning the end 16a of the cross-over tube 16 into the recess 14c of the sockolet 14, and rigidly connecting the tube 16 therein with a combination of conventional filet weld and bridge weld beads laid in the annular space 29 formed about the circumference of the end portion 16c of the tube 16 between the end 14b of the sockolet 14 and the stress collar 118.

In the operation of the joint 120, as the furnace tube 12 is heated and thermally expands, deflection of the cross-over tube 16 is restrained by the stress collar 118. Because there is an interference fit between the stress collar 118 and the cross-over tube 16, there is no gap 28 as there was in the previous embodiment, and stress is not concentrated at a point of contact as at the point 30 in the previous embodiment, which point 30 had been weakened as a result of the foregoing weld operation.

By the use of the joint 120 of the present invention as shown in FIG. 3, the bending moment induced in the cross-over tube 16 is more evenly distributed along the tube 16 between the tube 16 and the stress collar 118 than is possible in the joint 20 of the previous embodiment. Moreover, in contrast to the joint 20 configured with the gap 28, in the joint 120, a large portion of the bending moment induced in the tube 16 is transferred to the stress collar 18 thereby dissipating the bending stress in the tube 16. As a consequence of dissipating and distributing the stress in the cross-over tube 16, the maximum stress induced in the tube 16, particularly at the point 30, is much less than in the joint 120. Thus, the joint 120 of the present invention is effectively less susceptible than the prior art joint 20 to failure, hydrocarbon leakage, fires and explosions, and should require fewer unplanned and costly shutdowns to repair.

It is understood that the present invention can take many forms and embodiments. Accordingly, several variations may be made in the foregoing without departing from the spirit or the scope of the invention. For example, in lieu of the sockolet 14, any of a number of different types of fittings, couplings, or integrally reinforced branch connections such as, for example, a weldolet, or the like, may be substituted therefor. Furthermore, in some instances, it may be preferable to not use any type of fitting welded, or otherwise secured, to the lower end 12a of the furnace tube 12, so that the cross-over tube 16 may be welded directly to the lower end 12a of the furnace tube 12. In other variations, the foregoing method and apparatus for reinforcing a joint between tubes may be applied to the coupling together of pipes, tubes, and combinations thereof which may or may not be furnace tubes and/or cross-over tubes.

Having thus described the present invention by reference to certain of its preferred embodiments, it is noted that the embodiments disclosed are illustrative rather than limiting in nature and that many variations and modifications are possible within the scope of the present invention. Many such variations and modifications may be considered obvious and desirable by those skilled in the art based upon a review of the foregoing description of preferred embodiments.

Having thus described the invention, what is claimed is:

1. A reinforced tube joint consisting of:
   a first tube having an end portion;
   a stress collar fitted, with an interference fit, about the first tube so that the end portion of the first tube extends beyond an end portion of the stress collar; and
   a second tube having a fitting including a receptacle configured to receive at least a portion of the end portion of the first tube inside the receptacle and welded to both the end portion of the stress collar and the end portion of the first tube, at least a portion of the end portion of the first tube extending into the receptacle, the fitting being in fluid communication with the inside of the second tube and the inside of the first tube.

2. The joint of claim 1 wherein the stress collar is sized so that, when the stress collar and the first tube are at substantially the same temperature and are not fitted together, the outside diameter of the first tube exceeds the inside diameter of the stress collar by about 1 to about 20 mils.

3. The joint of claim 1 wherein the length of the stress collar is equal to at least the outside diameter of the first tube.

4. The joint of claim 1 wherein the length of the end portion of the first tube which extends beyond the stress collar is a multiple of the outside diameter of the first tube, the multiple being between about 0.1 to about 1.0.

5. The joint of claim 1 wherein the first tube is a cross-over tube and the second tube is a furnace tube.

6. The joint of claim 1 wherein the end of the second tube is defined by a fitting having an end configured for being rigidly connected to both the stress collar and the end portion of the first tube, the fitting being selected from a group of fittings consisting of a sockolet and a weldolet.

7. A method for fabricating a reinforced joint between an end portion of a first tube and an end of a second tube, the method consisting of:
   fitting, with an interference fit, a stress collar about the first tube so that the end portion of the first tube extends beyond the stress collar; and
   Positioning a fitting, including a receptacle, configured, to receive at least a portion, of the end portion, of the first tube inside the receptacle on the end of the second tube; and
   Rigidly connecting the receptacle on the end of the second tube to both the stress collar and the end portion of the first tube.

8. The method of claim 7 wherein, when the stress collar and the first tube are at substantially the same temperature and are not fitted together, the outside diameter of the first tube exceeds the inside diameter of the stress collar by about 1 to about 20 mils.

9. The method of claim 7 wherein the length of the stress collar is equal to at least the outside diameter of the first tube.

10. The method of claim 7 wherein the length of the end portion of the first tube which extends beyond the stress collar is a multiple of the outside diameter of the first tube, the multiple being between about 0.1 to about 1.0.

11. The method of claim 10 wherein the step of fitting the stress collar to the first tube further comprises heating the stress collar until the inside diameter of the stress collar exceeds the outside diameter of the first tube; sliding the stress collar over the first tube; and allowing the stress collar to cool in place on the first tube.

12. The method of claim 7 wherein the step of fitting the stress collar to the first tube comprises press fitting the stress collar onto the first tube.

13. The method of claim 7 wherein the first tube is a cross-over tube and the second tube is a furnace tube.

14. The method of claim 7 wherein the end of the second tube is defined by a coupling configured for being rigidly connected to both the stress collar and the end portion of the first tube, the coupling being selected from a group of couplings consisting of a sockolet and a weldolet.

* * * * *

UNITED STATES PATENT AND TRADEMARK OFFICE
CERTIFICATE OF CORRECTION

PATENT NO.   : 6,250,689 B1
DATED        : June 26, 2001
INVENTOR(S)  : Stephen F. McJones, Joseph U. Tleimat, J. William Jones It is certified that error appears in the above-identified patent and that said Letters Patent is hereby corrected as shown below:

<u>Column 6,</u>
Line 26, "method of claim 10 wherein" should read -- method of claim 7 wherein --.

Signed and Sealed this

Fifth Day of February, 2002

Attest:

JAMES E. ROGAN
*Attesting Officer*     *Director of the United States Patent and Trademark Office*